(12) United States Patent
Smithies et al.

(10) Patent No.: US 6,409,785 B1
(45) Date of Patent: Jun. 25, 2002

(54) CLEANABLE HEPA FILTER MEDIA

(75) Inventors: Alan Smithies, Overland Park; James Roy Doehla, Shawnee Mission; Anthony Joseph Thill, Overland Park, all of KS (US)

(73) Assignee: BHA Technologies, Inc., Kansas City, MO (US)

( * ) Notice: Subject to any disclaimer, the term of this patent is extended or adjusted under 35 U.S.C. 154(b) by 0 days.

(21) Appl. No.: 09/633,435

(22) Filed: Aug. 7, 2000

(51) Int. Cl.⁷ .............................................. B01D 46/02
(52) U.S. Cl. ............................ 55/486; 55/487; 55/522; 55/524; 55/527; 55/DIG. 2; 55/DIG. 39; 428/36.1
(58) Field of Search .................... 55/485, 486, 487, 55/497, 500, 502, 511, 521, 522, DIG. 2, DIG. 39, 524, 527; 428/36.1

(56) References Cited

U.S. PATENT DOCUMENTS

| | | |
|---|---|---|
| 4,728,349 A | 3/1988 | Oshitari |
| 4,877,433 A | 10/1989 | Oshitari |
| 5,207,812 A | 5/1993 | Tronto et al. |
| 5,507,847 A | 4/1996 | George et al. |
| 5,647,881 A * | 7/1997 | Zhang et al. ............ 55/DIG. 2 |
| D389,963 S | 1/1998 | Scanlon et al. |
| 5,783,086 A | 7/1998 | Scanlon et al. |
| D400,323 S | 10/1998 | Scanlon et al. |
| 5,928,414 A | 7/1999 | Wnenchak et al. |
| 6,030,428 A | 2/2000 | Ishino et al. |
| 6,156,086 A * | 12/2000 | Zhang .................... 55/DIG. 2 |

FOREIGN PATENT DOCUMENTS

| | | |
|---|---|---|
| DE | 42 34816 C1 | 10/1993 |
| WO | WO 00/62900 A1 | 10/2000 |

* cited by examiner

Primary Examiner—David A. Simmons
Assistant Examiner—Minh-Chau T. Pham
(74) Attorney, Agent, or Firm—Greg Strugalski

(57) ABSTRACT

A pleatable and cleanable filter media (22) that has a HEPA filtration rating. The filter media (22) includes a porous primary filtration layer (22). The primary filtration layer tending to be less than HEPA rated upon being damaged. A first substrate layer (64) attached to said primary filtration layer (62) for maintaining the shape of the filter media (22). The first substrate layer (64) includes a non-woven filtration media and being less than HEPA rated. A second substrate layer (82) attached to the first substrate layer (64) functioning as a secondary filter in the event of damage to the primary filtration layer (62). The second substrate layer (82) includes a non-woven filtration media and being less than HEPA rated.

18 Claims, 1 Drawing Sheet

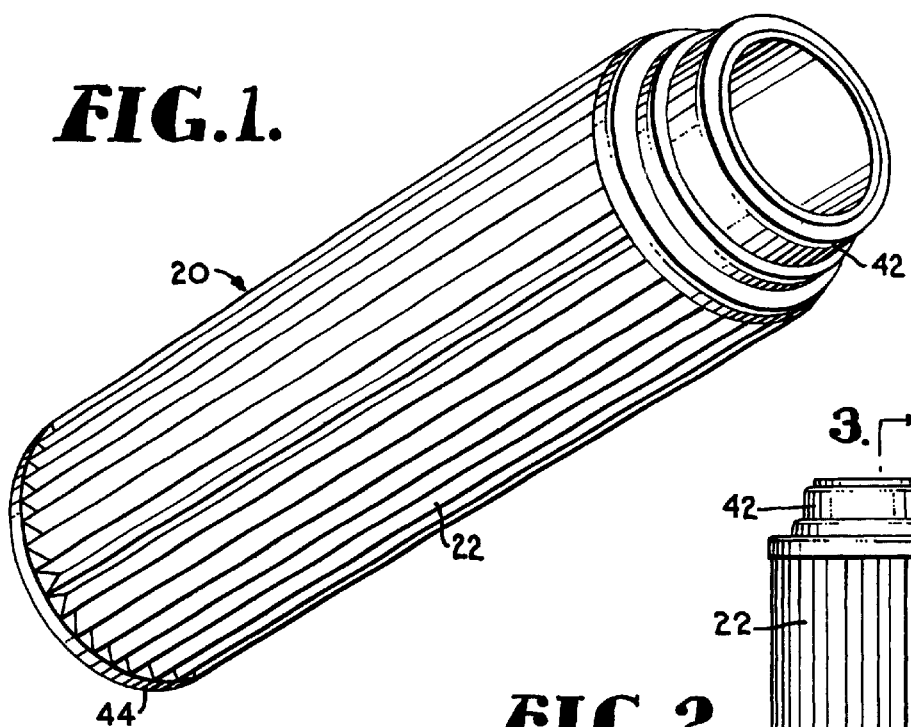
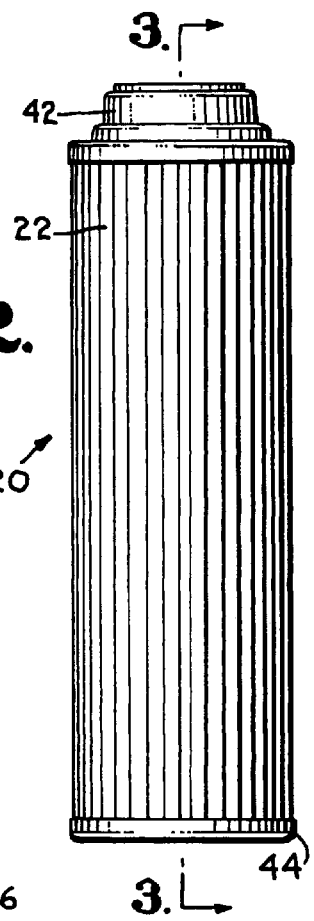
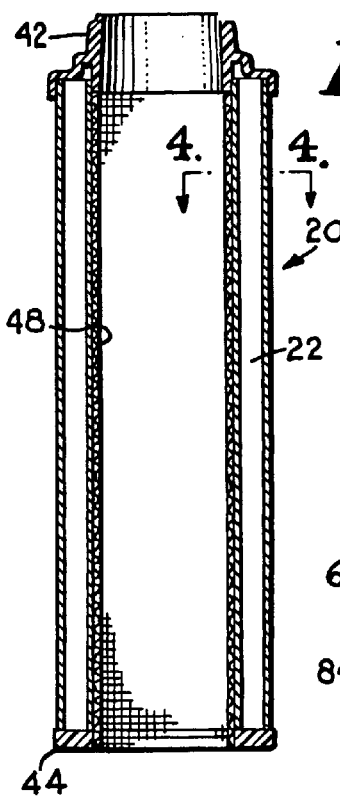
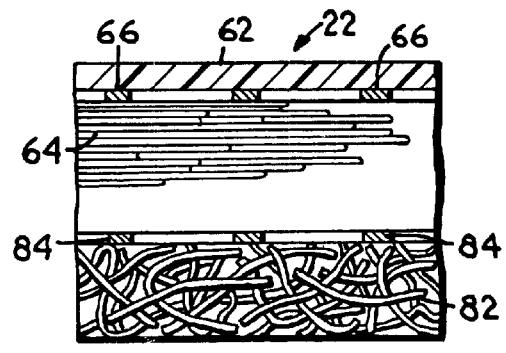

CLEANABLE HEPA FILTER MEDIA

BACKGROUND OF THE INVENTION

1. Technical Field

The present invention relates generally to a filter media. In particular, the present invention relates to a filter media that carries a HEPA rating after it is pleated and that is capable of repeatedly being easily cleaned for reuse.

2. Description of the Prior Art

Filter media that carries a relatively high efficiency rating commonly referred to as a High Efficiency Particulate Air (HEPA, 99.97% efficient at a 0.3 µm particle size) filter rating is known. For example, U.S. Pat. Nos. 4,877,433 and 5,507,847 disclose filter media including a porous membrane made from expanded polytetrafluoroethylene (ePTFE) with a HEPA filter rating. The filter media can be pleated. It has been found that a HEPA rating is difficult to obtain after a pleating operation because cracks or tears can be introduced into the membrane. These cracks and tears can provide a location for little or no filtration to take place and a reduction in total filtration efficiency of the media.

To prevent such cracking or tearing damage, the ePTFE membrane is typically "sandwiched" between two sheets of material that protect the ePTFE membrane during a pleating operation. However, such protective sheet material often collects the particulates being filtered and does not easily release the majority of the particulates. at least not without significant effort or measures.

SUMMARY OF THE INVENTION

The present invention is directed to a cleanable pleated filter media that has a HEPA filtration rating. The filter media comprises a porous primary filtration layer tending to be less than HEPA rated, especially after experiencing damage during a pleating operation. A first substrate layer is attached to the primary filtration layer to maintain the shape of the filter media. The first substrate layer comprises a non-woven filtration media that is less than HEPA rated. A second substrate layer is attached to the first substrate layer to serve as a secondary filter at areas of the primary filtration layer that may become damaged. The second substrate layer comprises a non-woven filtration media that is less than HEPA rated.

The porous primary filtration layer comprises an expanded polytetrafluoroethylene membrane. The filter media is pleated and retains a HEPA rating. The porous primary filtration layer is bonded to the first substrate layer. The first substrate layer is adhesively or thermally bonded to the second substrate layer.

The first substrate layer is made from a spun bond material of a weight in the range of 0.5 oz./sq. yd. to 12 oz./sq. yd and selected from the group including polyethylene terephthalate (PET) polyester, polyphenylene sulfide (PPS), or polypropylene (PP), a bicomponent fiber with a polybutylene terephthalate (PBT) sheath and a polyethylene terephthalate (PET) core and a bicomponent fiber with a polyethylene terephthalate (PET) core and a polyethylene (PE) sheath. The second substrate layer is made from melt blown material of a weight in the range 0.25 oz./sq. yd. to 5.0 oz./sq. yd. and selected from the group including glass, polypropylene (PP), polybutylene terephthalate (PBT), polyphenylene sulfide (PPS), ethylene-chlorotrifluorethylene (ECTFE), polyethylene terephthalate (PET) polyester and polyethylene (PE). The filter media has an air flow regeneration of at least 99% immediately subsequent to being cleaned by loosening accumulated particulates from a filtering surface of said primary filtration layer.

BRIEF DESCRIPTION OF THE DRAWINGS

Further features of the present invention will become apparent to those skilled in the art to which the present invention relates from reading the following description with reference to the accompanying drawings, in which:

FIG. 1 is a perspective view of a filter cartridge incorporating a filter media embodying the present invention;

FIG. 2 is an elevation view of the filter cartridge illustrated in FIG. 1

FIG. 3 is a sectional view of the filter cartridge, taken approximately along line 3—3 in FIG. 2; and FIG. 4 is an enlarged cross-sectional view of the filter media of the filter cartridge, taken approximately along line 4—4 in FIG. 3.

DESCRIPTION OF A PREFERRED EMBODIMENT

A filter cartridge 20 (FIGS. 1–3), by way of example, is intended for use in a vacuum cleaner (not shown). The vacuum cleaner may be of any suitable design, such as for use in residential, industrial or commercial applications. Preferably, the filter cartridge 20 has the ability to filter relatively small particles from a fluid stream at a relatively high efficiency. For example, the filter cartridge 20 is designed to carry a HEPA (high efficiency particulate air) filter rating. That is, the filter cartridge 20 removes at least 99.97% of the particles as small as 0.3 micron from an air stream flowing through the filter cartridge.

The filter cartridge 20 includes a pleated filter media 22, constructed according to the present invention. The filter media 22 has a predetermined number of pleats and is formed into a generally cylindrical shape. This pleated and cylindrical configuration provides a maximum surface area at a relatively low pressure drop for a desired filtration efficiency. The filter cartridge 20 is process tolerant, has a HEPA rating and is "regenerable" by repeated cleaning for continued use without replacement while maintaining a significant percentage of its initial cleaning efficiency and air permeability. It will be apparent that the filter media 22 could be used for other applications, such as for air pollution control, clean room, automotive and other fine filtration requirements and have other configurations, such as flat sheet or pleated flat panel.

The filter cartridge 20 also includes a connection structure 42 located at an upper axial first end, as viewed in FIGS. 1–3. The connection structure 42 is for attaching to vacuum cleaner flow ducting (not shown). The connection structure 42 is made from a flexible elastomeric material that also serves as a seal when surrounding the ducting. The connection structure 42 may be constructed to fit tightly around ducting to hold the filter cartridge 20 in place and form a seal. The connection structure 42 may optionally receive a clamping device (not shown) to offer better sealing and holding action, if desired. An end cap 44 is located at a lower second end as review in FIGS. 1–3, axially opposite the connection structure 42. The connection structure 42 and end cap 44 surround and pot axially opposite end portions of the filter media 22.

The filter cartridge 20 also includes a cage 48 (FIG. 3) located within the filter cartridge 20. The cage 48 is attached to the connection structure 42 and end cap 44. The cage 48 provides radial inward support for the filter media 22 to prevent inward collapse of the filter media.

The filter media 22 includes three distinct layers of filtration material. Each of the three layers of filtration material does not necessarily carry a HEPA rating individually. However, when combined they provide a pleated HEPA filter media 22 that can be regenerated by applying a cleaning force to the filter cartridge 20 when constructed according to the present invention.

The filter media 22 includes a porous, preferably microporous, primary filtration layer 62 (FIG. 4). The primary filtration layer 62 is preferably an expanded polytetrafluoroethylene (ePTFE) membrane. One such suitable ePTFE membrane is manufactured by BRA Technologies, Inc. in Kansas City, Miss. as QM005 (HEPA Style Filtration Media) with an average pore size of about 0.750 micron and a thickness of about 0.002 inch. The ePTFE membrane of the primary filtration layer 62 may have a filtration efficiency of a HEPA rating by itself but could fall below a HEPA rating if damaged during a manufacturing operation, such as pleating, or assembly or use. The ePTFE membrane of the primary filtration layer 62 typically has a pressure drop across it of about 15 mm of water under HEPA test conditions. per the Institute of Environmental Sciences standard test method IES-RP-CC021.1

The ePTFE membrane of the primary filtration layer 62 is the outermost layer, or the first layer in the direction of the air flow stream, and performs the majority of the filtration task of the filter media 22 in undamaged areas by a mechanism termed "surface filtration". Surface filtration is the prevention of the passage of particulates in the air stream by collecting them at the surface of the primary filtration layer 62, rather than by penetration into the filter media 22. Thus, any accumulated particulates on the surface of the ePTFE membrane of the primary filtration layer 62 can be easily loosened by the cleaning force applied to the filter cartridge 20 so they can fall away from the ePTFE membrane.

The filter media 22 also includes a first filtration substrate layer 64 that is attached to the primary filtration layer 62. The first filtration substrate layer 64 provides pleat process tolerance to the filter media 22 and shape retention. The first filtration substrate layer 64 is made from a non-woven fiber material, such as spun bond filtration media. Preferably, the first filtration substrate layer 64 has a weight in the range of about 0.5 oz./sq. yd. to 12 oz./sq. yd., and preferably about 5.0 oz./sq. yd.

The first filtration substrate layer 64 is preferably made from a spun bond media such as a polyester (PE) fiber material, a bicomponent fiber with a polybutylene terephthalate (PBT) sheath and a polyethylene terephthalate (PET) core available from Johns-Manville Corporation or a bicomponent fiber available from Unitika with a polyethylene terephtalate (PET) core and a polyethylene (PE) sheath. Other suitable fiber materials for the first filtration substrate layer 64 may include, without limitation, polyethylene terephthalate (PET) polyester, polyphenylene sulfide (PPS) or polypropylene (PP). The first filtration substrate layer 64 does not have a filtration efficiency of a HEPA rating by itself. The efficiency of the first filtration substrate layer 64 is typically about 18–20% for a HEPA challenge particle size of 0.3 micron and has a pressure drop of about 2 mm of water.

The first filtration substrate layer 64 is preferably bonded at bond sites 66 to the ePTFE membrane of the primary filtration layer 62 by thermal lamination of a sheath of a bicomponent fiber in the first filtration substrate layer. This attachment contributes a pressure drop of about 8–10 mm of water. An optional attachment is the first filtration substrate layer 64 bonded to the primary filtration substrate layer 62 with a material, such as a Sharnet® plastic mesh available from Bostik Inc., that melts to form the bond sites 66 and connect together the two layers. It will be apparent that other suitable attachment mechanisms for the bond sites 66 can be used, such as adhesive bonding. It is felt that the use of adhesive for the bond sites 66 offers an advantage because it may be more flexible and, thus, more forgiving during a pleating operation than a thermal lamination bond. It is also felt that the Sharnet may have advantages because it has little adverse impact on airflow through the filter media 22 or pressure drop across it.

The filter media 22 further includes a second filtration substrate layer 82 that is attached to the first filtration substrate layer 64. The second filtration substrate layer 82 does not have a filtration efficiency of a HEPA rating by itself. The efficiency of the second filtration substrate layer 82 is typically about 80–82% for a HEPA challenge particle size of 0.3 micron at a pressure drop of a relatively low 3 mm of water. The second filtration substrate layer 82 will typically serve as a backup filtration layer to the first or primary or first filtration layer 62 when it has a tear or a crack in it from a pleating operation, misuse or mishandling. Thus, the HEPA rating can be maintained by the filter media 22 even if the primary filtration layer 62 is damaged during manufacture, assembly into the cartridge 20 or use.

The second filtration substrate layer 82 is made from a non-woven material, such as a melt blown filtration media. Preferably, the second filtration substrate layer 82 has a weight in the range of about 0.25 oz./sq. yd. to 5.0 oz./sq. yd., and preferably about 0.75 oz./sq. yd. The second filtration substrate layer 82 is preferably made from polypropylene (PP) melt blown media. Other suitable fiber materials for the second filtration substrate layer 82 may include, without limitation glass, melt blown polyethylene terephthalate (PET) polyester, polybutylene terephthalate (PBT), polyphenylene sulfide (PPS), ethylenechlorotrifluorethylene (ECTFE) or polyethylene (PE).

The second filtration substrate layer 82 is preferably adhesively bonded to the first filtration substrate layer 64 with an air permeable hot melt acrylic or urethane material at bond sites 84 for a pressure drop contribution of about 2 mm of water. This enables a pleating process0 to form a pleated media that can retain a HEPA rating after pleating by being relatively flexible so not to create stress risers in the resultant laminated sheet during pleating. handling and in service. It will be apparent that other suitable attachment mechanisms for the bond sites 84 can be used, such as thermal lamination. An optional attachment mechanism for attaching any two layers together would be to physically contact the layers together in a copleat operation. Thus, the bond sites would be eliminated as well as the associated reduction in air flow and increase in pressure drop.

The filter media 22 of the present invention has a HEPA filtration efficiency in flat sheet form, pleated form and when in the filter cartridge 20. The filter media 22 is deemed to be process tolerant because it can withstand pleating on a blade pleater, push bar or rotary pleater and maintain its HEPA rating after it is pleated and placed into its end use form.

A filtration efficiency test was conducted on a filter cartridge 20 incorporating the pleated filter media 22 made according to the present invention. The test was conducted at an air velocity of 10.5 ft./min. passing through the filter media 22 and a pressure drop across the filter media of relatively low 30–32 mm of water. The test was conducted using a neutralized potassium chloride aerosol. The efficiency results as a function of test particle size, in percentage of challenge particles prevented from passing through the filter media 22, appears in Table 1, below.

TABLE 1

| test particle size range (μm) | filtration efficiency % |
|---|---|
| 0.3–0.5 | 99.976 |
| 0.5–0.7 | 99.979 |
| 0.7–1.0 | 99.985 |
| 1.0–2.0 | 99.990 |
| 2.0–3.0 | 99.994 |
| 3.0–5.0 | 99.999 |
| 5.0–10.0 | 100.000 |
| >10.0 | 100.000 |

Testing was also conducted to determine the "air flow regeneration" of the filter media 22. The testing consisted of ten cycles of simulated cleaning that captures a predetermined volume of challenge particles in the filter media 22. One test cycle included mounting the filter cartridge 20 in a test rig. Air was circulated through the filter cartridge 20 and challenge particles introduced into the air stream. The beginning and ending airflows in cubic feet per minute (CFM) were recorded at the start and finish of the challenge particles being accumulated on the outer surface of the primary filtration layer 62 of the filter media 22. Regeneration was accomplished by holding the connection structure 42 of the filter cartridge 20 and tapping the end cap 44 against a surface to loosen particulates accumulated on the outer surface of the primary filtration layer 62. The test cycle was performed again until the desired number of cycles was reached. It was found that the filter media 22 had air flow regeneration as defined by, on the average per cycle. at least 99.5% of its beginning airflow and at least 99.4% of its ending airflow of a previous test cycle.

From the above description of preferred embodiments of the invention, those skilled in the art will perceive improvements, changes and modifications. Such improvements, changes and modifications within the skill of the art are intended to be covered by the appended claims.

Having described at least one preferred embodiment of the invention, what is claimed is:

1. A cleanable filter media laminate, said cleanable filter media laminate comprising:
   a porous primary filtration layer, said primary filtration layer tending to have less than a HEPA filtration rating upon being damaged, said porous primary filtration layer comprising a microporous expanded polytetrafluoroethyene membrane;
   a first substrate layer attached to said primary filtration layer for maintaining shape of said filter media, said first substrate layer comprising a non-woven filtration media and being less than HEPA rated; and
   a second substrate layer attached to said first substrate layer to function as a secondary filter in the event of damage to said primary filtration layer, said second substrate layer comprising a non-woven filtration media and being less than HEPA rated; and
   said cleanable filter media laminate being pleated and having a HEPA filtration rating.

2. The filter media of claim 1 wherein said porous primary filtration layer is bonded to said first substrate layer.

3. The filter media of claim 1 wherein said porous primary filtration layer is thermally laminated to said first substrate layer.

4. The filter media of claim 1 wherein said first substrate layer is adhesively bonded to said second substrate layer.

5. The filter media of claim 1 wherein said first substrate layer is thermally laminated to said second substrate layer.

6. The filter media of claim 1 wherein said first substrate layer is made from fiber material of a weight in the range of 0.5 oz./sq. yd. to 12 oz./sq. yd. and selected from the group including spun bond polyethylene terephthalate (PET) polyester, polyphenylene sulfide (PPS), or polypropylene (PP), a bicomponent fiber with a polybutylene terephthalate (PBT) sheath and a polyethylene terephthalate (PET) core and a bicomponent fiber with a polyethylene terephthalate (PET) core and a polyethylene (PE) sheath.

7. The filter media of claim 1 wherein said second substrate layer is made from fiber material of a weight in the range 0.25 oz./sq. yd. to 5.0 oz./sq. yd. and selected from the group including glass, melt blown polypropylene (PP), polybutylene terephthalate (PBT), polyphenylene sulfide (PPS), ethylene-chlorotrifluorethylene (ECTFE) polyethylene terephthalate (PET) polyester and polyethylene (PE).

8. The filter media of claim 1 wherein said filter media has an air flow regeneration of at least 99% immediately subsequent to being cleaned by loosening accumulated particulates from a filtering surface of said primary filtration layer.

9. A cleanable and pleated filter media that has a HEPA filtration rating, said filter media comprising:
   a porous primary filtration layer, said primary filtration layer comprising a microporous expanded polytetrafluoroethylene tending to be less than HEPA rated after a pleating operation, said primary filtration layer capable of releasing accumulated particulates upon said filter media being exposed to an external cleaning force;
   a first substrate layer attached to said primary filtration layer to maintain the shape of said filter media, said first substrate layer comprising a spun bond filtration media and being less than HEPA rated; and
   a second substrate layer attached to said first substrate layer to serve as a secondary filtration media in the event that said primary filtration layer is damaged, said second substrate layer comprising a melt blown filtration media and being less than HEPA rated;
   wherein said filter media has an air flow regeneration of at least 99% immediately subsequent to being cleaned by loosening accumulated particulates from a filtering surface of said primary filtration layer.

10. The filter media of claim 9 wherein said first substrate layer is made from the filter media of claim 1 wherein said first substrate layer is made from fiber material of a weight in the range of 0.5 oz./sq. yd. to 12 oz./sq. yd. and selected from the group including spun bond polyethylene terephthalate (PET) polyester, polyphenylene sulfide (PPS), or polypropylene (PP), a bicomponent fiber with a polybutylene terephthalate (PBT) sheath and a polyethylene terephthalate (PET) core and a bicomponent fiber with a polyethylene terephthalate (PET) core and a polyethylene (PE) sheath.

11. The filter media of claim 9 wherein said second substrate layer is made from the filter media of claim 1 wherein said second substrate layer is made from fiber material of a weight in the range 0.25 oz./sq. yd. to 5.0 oz./sq. yd. and selected from the group including glass, melt blown polypropylene (PP), polybutylene terephthalate (PBT), polyphenylene sulfide (PPS), ethylene-chlorotrifluorethylene (ECTFE) polyethylene terephthalate (PET) polyester and polyethylene (PE).

12. The filter media of claim 9 wherein said porous primary filtration layer is bonded to said first substrate layer.

13. The filter media of claim 9 wherein said porous primary filtration layer is thermally laminated to said first substrate layer.

14. The filter media of claim 9 wherein said first substrate layer is adhesively bonded to said second substrate layer.

15. The filter media of claim 9 wherein said first substrate layer is thermally laminated to said second substrate layer.

16. A cleanable and pleated filter media that has a HEPA filtration rating, said filter media comprising:
- a porous primary filtration layer, said primary filtration layer comprising a microporous expanded polytetrafluoroethylene tending to be less than HEPA rated upon being damaged, said primary filtration layer capable of releasing accumulated particulates upon said filter media being exposed to an external cleaning force;
- a first substrate layer bonded to said primary filtration layer to maintain the shape of said filter media, said first substrate layer comprising a spun bond filtration media and being less than HEPA rated; and
- a second substrate layer adhesively bonded to said first substrate layer to serve as a secondary filtration layer upon damage to said primary filtration layer. said second substrate layer comprising a melt blown filtration media and being less than HEPA rated;
- wherein said filter media has an air flow regeneration of at least 99% immediately subsequent to being cleaned by loosening accumulated particulates from a filtering surface of said primary filtration layer.

17. The filter media of claim 16 wherein said first substrate layer is made from the filter media of claim 1 wherein said first substrate layer is made from fiber material of a weight in the range of 0.5 oz./sq. yd. to 12 oz./sq. yd. and selected from the group including spun bond polyethylene terephthalate (PET) polyester, polyphenylene sulfide (PPS), or polypropylene (PP), a bicomponent fiber with a polybutylene terephthalate (PBT) sheath and a polyethylene terephthalate (PET) core and a bicomponent fiber with a polyethylene terephthalate (PET) core and a polyethylene (PE) sheath.

18. The filter media of claim 16 wherein said second substrate layer is made from the filter media of claim 1 wherein said second substrate layer is made from fiber material of a weight in the range 0.25 oz./sq. yd. to 5.0 oz./sq. yd. and selected from the group including glass, melt blown polypropylene (PP), polybutylene terephthalate (PBT), polyphenylene sulfide (PPS), ethylene-chlorotrifluoroethylene (ECTFE) polyethylene terephthalate (PET) polyester and polyethylene (PE).

\* \* \* \* \*